United States Patent
Hosaka

(10) Patent No.: US 12,540,033 B2
(45) Date of Patent: Feb. 3, 2026

(54) PART DELIVERY SYSTEM

(71) Applicant: FUJI CORPORATION, Chiryu (JP)

(72) Inventor: Hideki Hosaka, Anjo (JP)

(73) Assignee: FUJI CORPORATION, Chiryu (JP)

( * ) Notice: Subject to any disclaimer, the term of this patent is extended or adjusted under 35 U.S.C. 154(b) by 537 days.

(21) Appl. No.: 18/004,580

(22) PCT Filed: Jul. 10, 2020

(86) PCT No.: PCT/JP2020/027000
§ 371 (c)(1),
(2) Date: Jan. 6, 2023

(87) PCT Pub. No.: WO2022/009412
PCT Pub. Date: Jan. 13, 2022

(65) Prior Publication Data
US 2023/0242342 A1 Aug. 3, 2023

(51) Int. Cl.
*G07F 7/00* (2006.01)
*B65G 1/137* (2006.01)
*H05K 13/02* (2006.01)

(52) U.S. Cl.
CPC ......... *B65G 1/1371* (2013.01); *B65G 1/1373* (2013.01); *H05K 13/021* (2013.01)

(58) Field of Classification Search
CPC .... B65G 1/1371; B65G 1/1373; B65G 35/00; B65G 1/00; B65G 1/02; B65G 1/137;
(Continued)

(56) References Cited

U.S. PATENT DOCUMENTS 5,912,818 A * 6/1999 McGrady ................ G06M 7/04
700/214
2014/0145822 A1 5/2014 Shoenfeld
(Continued)

FOREIGN PATENT DOCUMENTS

AU 728806 B2 1/2001
AU 2016100803 A4 8/2016
(Continued)

OTHER PUBLICATIONS

International Search Report issued Sep. 24, 2020 in PCT/JP2020/027000 filed Jul. 10, 2020, 2 pages.

*Primary Examiner* — Yolanda R Cumbess
(74) *Attorney, Agent, or Firm* — Oblon, McClelland, Maier & Neustadt, L.L.P.

(57) ABSTRACT

A part delivery system includes a storage device configured to store part information including a part ID for identifying a part for each part and presence or absence of security, an input device configured to input information, and a control device. The control device receives designation of a part to be delivered from a user and determines whether security is applied to a received designated part based on the part information. The control device delivers the designated part when it is determined that the security is not applied to the designated part. Meanwhile, the control device requests the user to input authentication information on the designated part when it is determined that the security is applied to the designated part and delivers the designated part only when authentication is successful based on the authentication information input by the user through the input device.

3 Claims, 6 Drawing Sheets

(58) Field of Classification Search
CPC .... H05K 13/021; H05K 13/041; G06Q 10/08; G06Q 10/087; G06Q 10/0875; G06Q 10/0832; G06Q 10/08365
USPC .................................................. 700/213–215
See application file for complete search history.

(56) References Cited

U.S. PATENT DOCUMENTS

2016/0200462 A1\* 7/2016 Kriheli ............. G06Q 10/06316
                                                                            700/214
2018/0130011 A1\* 5/2018 Jacobsson ............ H05K 13/021

FOREIGN PATENT DOCUMENTS

| | | |
|---|---|---|
| JP | 2003-54704 A | 2/2003 |
| JP | 2018-164018 A | 10/2018 |

\* cited by examiner

PART DELIVERY SYSTEM

TECHNICAL FIELD

The present specification discloses a part delivery system.

BACKGROUND ART

It has been proposed that a part storage facility including an accommodation section capable of accommodating parts, an opened part entrance/exit opening, an open/close body that opens and closes a part entrance/exit opening such that the accommodation section can be shielded from the outside, and a display section that displays a setting screen for setting stock/delivery information, instructs that authentication information for authenticating an operator should be input, when the part is delivered from the accommodation section (refer to, for example, Patent Literature 1).

PATENT LITERATURE

Patent Literature 1: JP-A-2003-54704

BRIEF SUMMARY

Technical Problem

In a case where a normal part (for example, an inexpensive part) and a specific part (for example, an expensive part) are mixed in multiple types of parts accommodated in a single accommodation section (part storage), when security is applied to all the parts, smooth delivery can be obstructed.

A main object of the present disclosure is to provide a part delivery system capable of preventing a specific part from being illegally taken out while smoothly delivering a normal part.

Solution to Problem

In order to achieve the above-described main object, the part delivery system of the present disclosure employs the following means.

The part delivery system according to the present disclosure is a part delivery system that configured to deliver a part designated from multiple parts stored in a part storage, and a gist thereof is to include a storage device configured to store part information including a part ID for identifying a part and presence or absence of security for each part, an input device configured to input information, and a control device configured to receive designation of a part to be delivered from a user, determine whether security is applied to the received designated part based on the part information, deliver the designated part when it is determined that the security is not applied to the designated part, request the user to input authentication information on the designated part when it is determined that the security is applied to the designated part, and deliver the designated part only when authentication is successful based on the authentication information input by the user through the input device.

A part delivery system of the present disclosure includes a storage device configured to store part information including a part ID for identifying a part for each part and presence or absence of security and a control device. The control device receives designation of a part to be delivered from a user and determines whether security is applied to a received designated part based on the part information stored in the storage device. The control device delivers the designated part when it is determined that the security is not applied to the designated part. Meanwhile, the control device requests the user to input authentication information on the designated part when it is determined that the security is applied to the designated part and delivers the designated part only when authentication is successful based on the authentication information input by the user. Thereby, when a normal part and a specific part are mixed in a single part storage, security can be applied to only the specific part. As a result, it is possible to provide a part delivery system capable of preventing a specific part from being illegally taken out while smoothly delivering a normal part.

DESCRIPTION OF EMBODIMENTS

Figure 1:
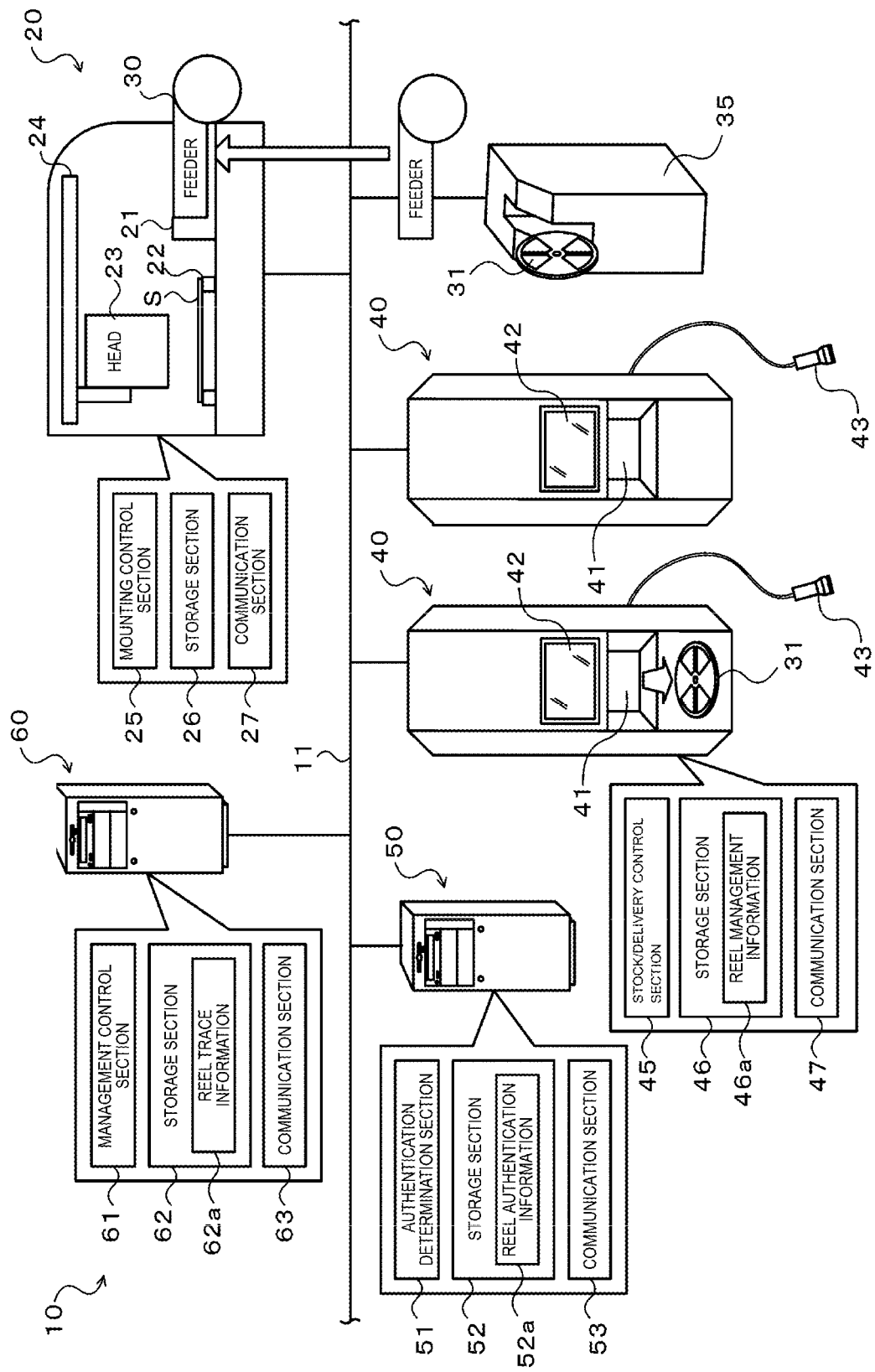
FIG. 1 is a schematic configuration diagram of a production system.

An embodiment for implementing the present disclosure will be described with reference to accompanying drawings. FIG. 1 is a schematic configuration diagram of a production system. As illustrated, production system 10 includes multiple part mounting machines 20, reel loader 35, multiple reel storages 40, authentication server 50, and management server 60. These are communicably connected to each other via network 11.

Each part mounting machine 20 picks up (adsorbs) a part supplied by feeder 30 and mounts the part on board S. Part mounting machine 20 includes feeder base 21 to which a feeder is detachable, board conveyance device 22 for carrying in and out board S, head 23 having a nozzle capable of picking up a part, and head moving device 24 for moving head 23. Furthermore, part mounting machine 20 includes mounting control section 25 for controlling all the mounting machines, storage section 26 for storing a processing program and various data, and communication section 27 for communicating with management server 60 via network 11.

Feeder 30 is a tape feeder and includes reel 31 on which a tape accommodating parts is wound. Further, in addition to this, although not illustrated, feeder 30 includes a tape feeding mechanism for ejecting a tape from reel 31 and feeding the tape to a part supply position, a feeder control section for controlling a tape feeding mechanism, a communication section for communicating with part mounting machine 20 on which feeder 30 is mounted, and the like. Cavities are formed in the tape wound on reel 31 at predetermined intervals in a longitudinal direction of the tape. The cavities each accommodate parts. The parts are protected by a film covering a surface of the tape. As the film is peeled off directly before the part supply position, the part accommodated in the tape is exposed at the part supply position to be picked up by a nozzle of head 23.

Reel loader 35 is configured to automatically set reel 31 onto feeder 30. Although not illustrated, reel loader 35 includes a read section that reads a barcode or the like attached to reel 31 to acquire information (for example, an information data (ID) for identifying the reel, a part type, a remaining number of parts, and the like) on reel 31, a communication section that transmits the read information to management server 60 via network 11, and the like.

Multiple reel storages 40 store multiple reels 31. Reel storage 40 includes stock/delivery opening 41, multiple cassettes (not illustrated) each having multiple slots capable of accommodating reels 31, a gripper table (not illustrated) having a chuck for gripping reel 31, and a table moving device (not illustrated) for moving the gripper table. A shutter (not illustrated) for opening and closing stock/delivery opening 41 is installed in stock/delivery opening 41. By moving the clipper table, the table moving device accommodates (stock) reel 31 placed on the gripper table in an empty slot of a cassette from stock/delivery opening 41, or takes out reel 31 from the slot in which reel 31 is accommodated and ejects (delivers) reel 31 to the stock/delivery opening 41. Reel storage 40 includes multiple columns of multiple cassettes stacked on top of each other. Further, reel storage 40 includes multiple types of cassettes having different sizes such that multiple types of reels 31 having different diameters and heights (tape widths) can be stored as multiple cassettes.

Figure 2:
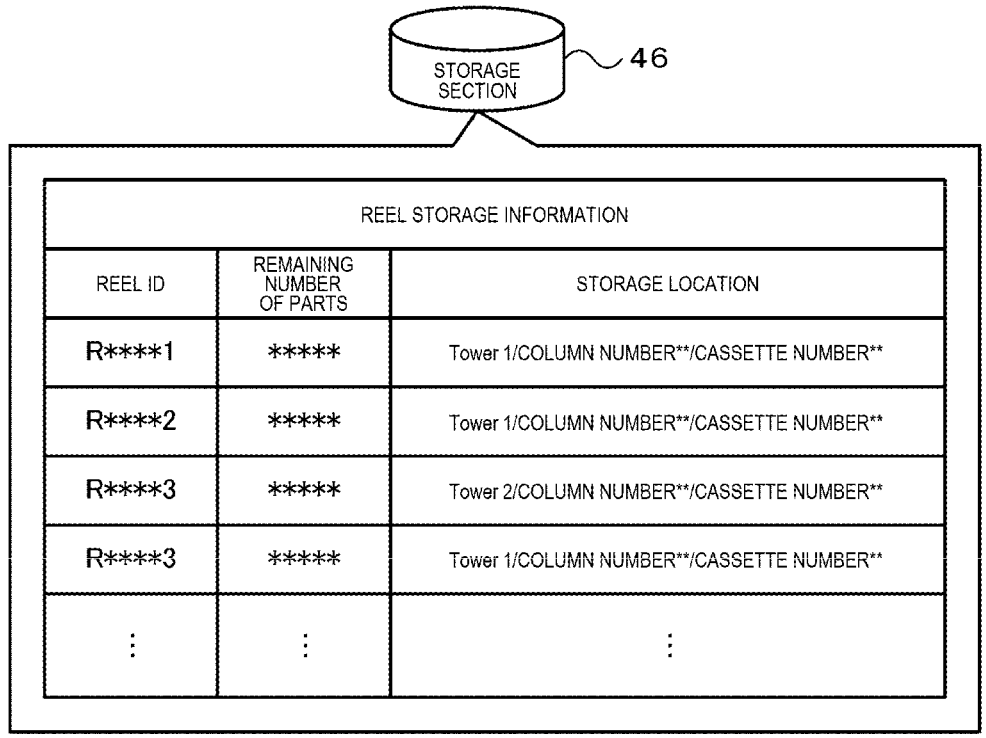
FIG. 2 is an explanatory diagram illustrating an example of reel storage information.

Further, in addition to this, reel storage 40 includes operation panel 42 configured as a touch panel type display, reader 43 (a barcode reader) for reading an authentication code, stock/delivery control section 45 for controlling stock and delivery, storage section 48 for storing various types of information, communication section 47 for communicating via network 11, and the like. Storage section 46 includes user information (for example, a user ID and a password) relating to a user (operator) and reel storage information 46a relating to storage of reel 31. FIG. 2 is an explanatory diagram illustrating an example of reel storage information stored in a storage section. Reel storage information 46a includes a reel ID for identifying reel 31, the remaining number of parts accommodated in reel 31, and a storage location (information on which reel 31 is stored in a cassette (slot) in a row of reel storage 40) of reel 31.

Figure 3:
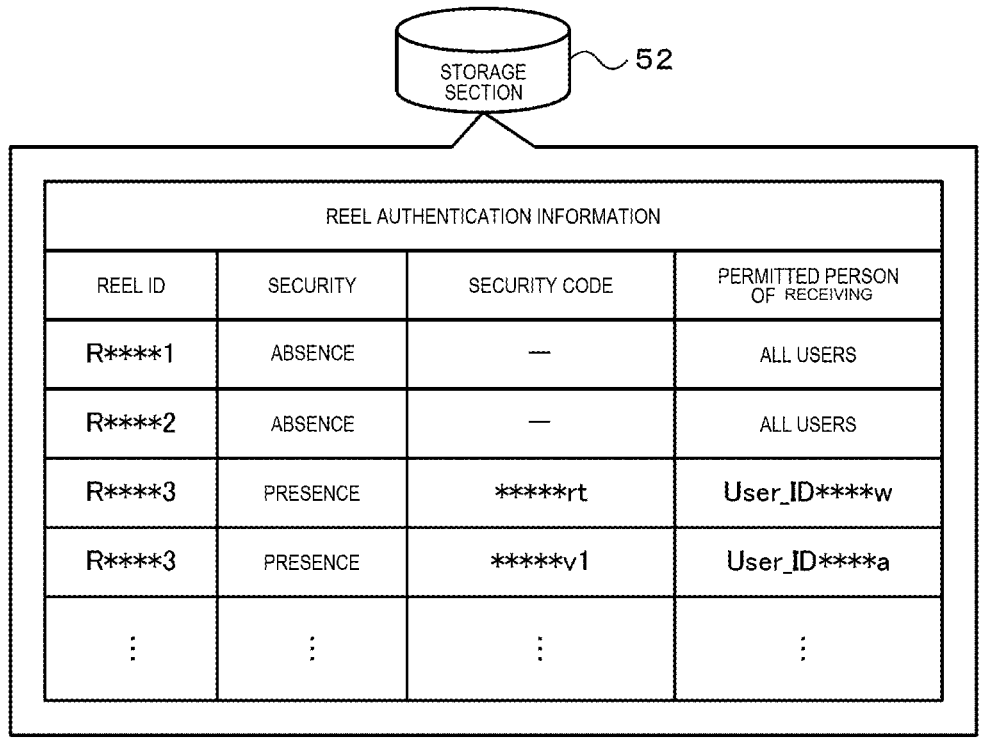
FIG. 3 is an explanatory diagram illustrating an example of reel authentication information.

Authentication server 50 includes authentication determination section 51, storage section 52 for storing various types of information, and communication section 53 that performs communication via network 11. Storage section 52 includes reel authentication information 52a relating to authentication of reel 31. FIG. 3 is an explanatory diagram illustrating an example of reel authentication information stored in a storage section. Reel authentication information 52a includes a reel ID, presence or absence of security indicating whether security is applied to reel 31, a security code when security is applied to reel 31, and a user ID of a permitted person who is permitted to receive reel 31. When receiving an authentication request from stock/delivery control section 45 of reel storage 40, authentication determination section 51 performs authentication as to whether a person receiving the reel 31 is appropriate based on the information included in reel authentication information 52a.

Figure 4:
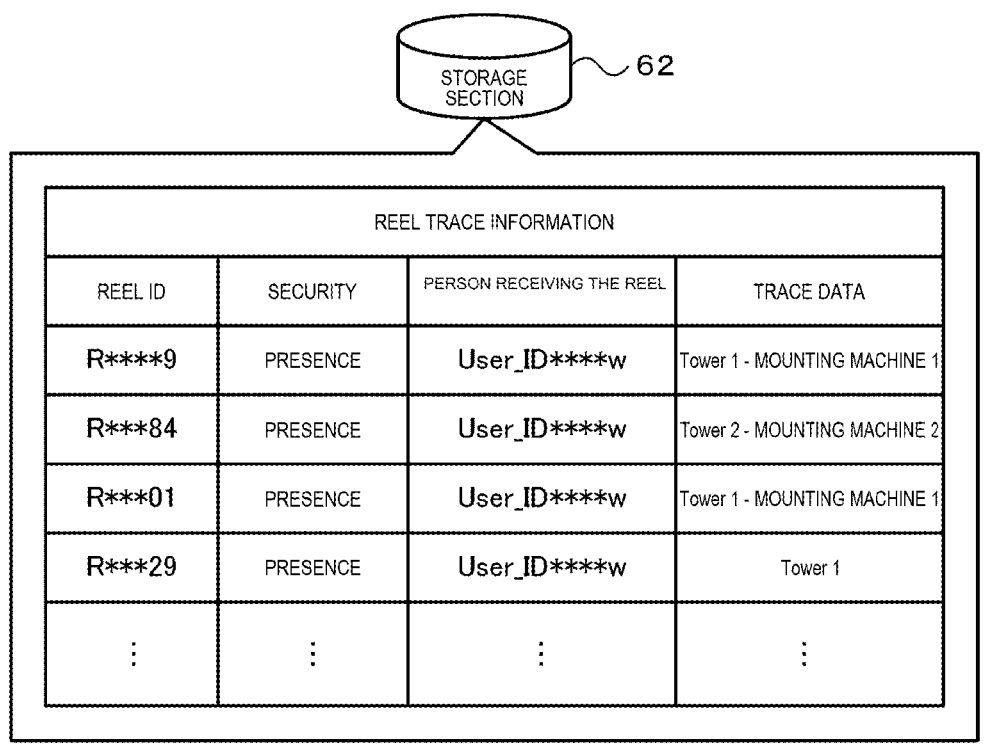
FIG. 4 is an explanatory diagram illustrating an example of reel trace information.

Management server 60 manages the entire system and includes management control section 61, storage section 62 for storing various types of information, and communication section 63 for performing communication via network 11. Storage section 62 includes reel trace information 62a of reel 31. FIG. 4 is an explanatory diagram illustrating an example of reel trace information stored in a storage section. Reel trace information 62a includes information for managing delivered reel 31. Specifically, reel trace information 62a includes a reel ID, presence or absence of security, a person receiving the reel (user ID), and reel trace information. Management control section 61 generates a production job for producing a mounted board on which parts are mounted, transmits the generated production job to each part mounting machine 20, and receives information on a mounting situation from part mounting machine 20, thereby managing production and managing trace information of reel 31.

Figure 5:
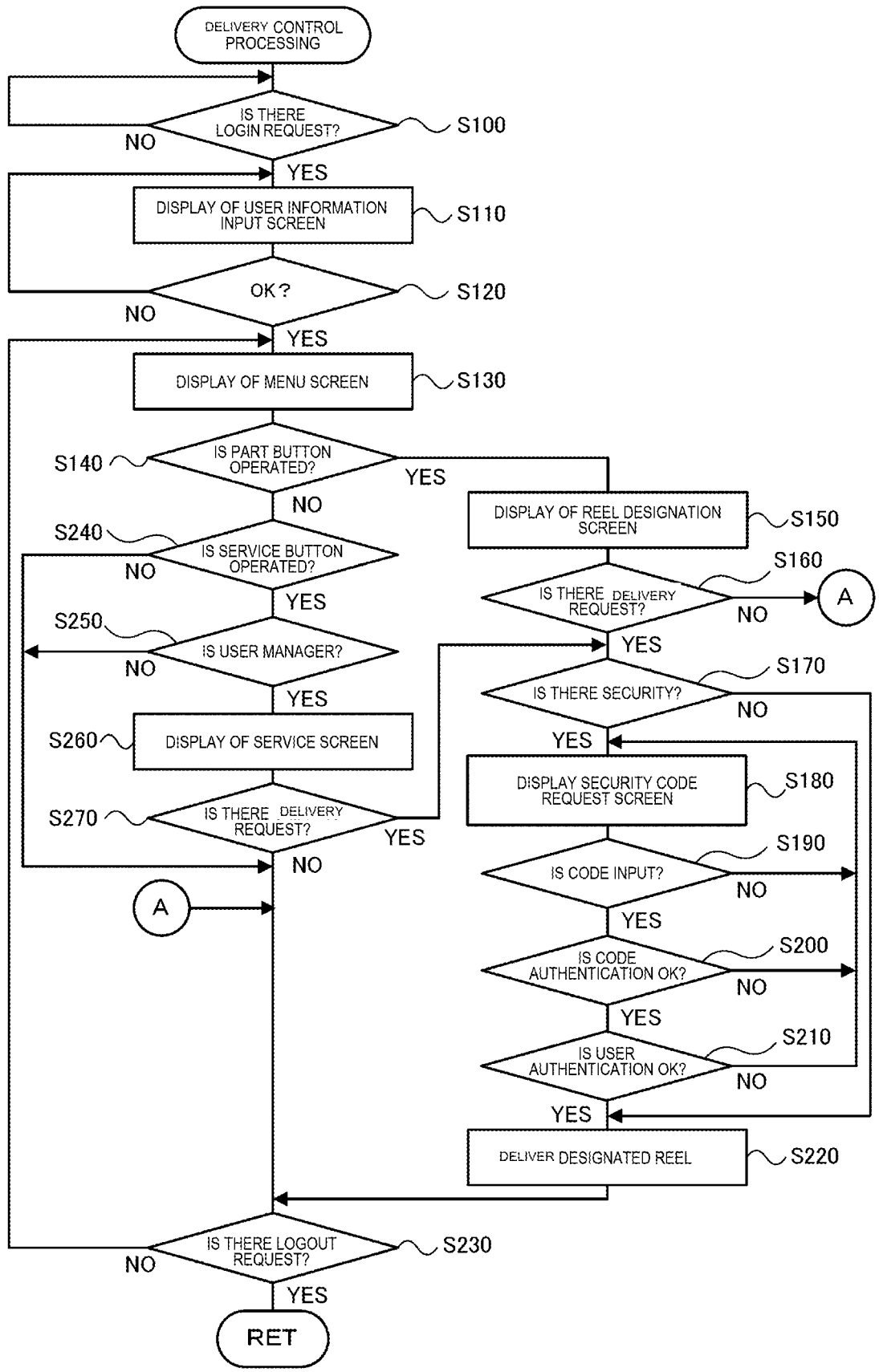
FIG. 5 is a flowchart illustrating an example of delivery control processing.
Figure 6:
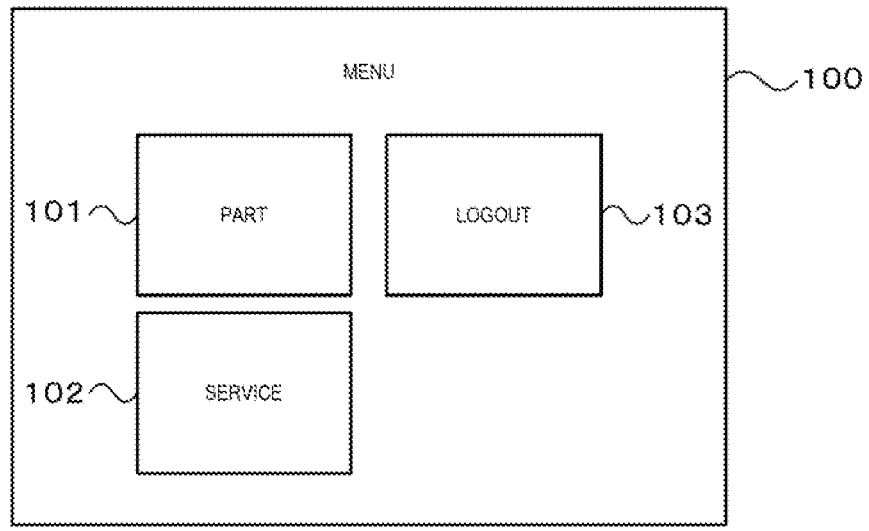
FIG. 6 is an explanatory diagram illustrating an example of a menu screen.

Next, descriptions will be given for a process for an operator to deliver necessary reel 31 from reel storage 40 when it is necessary to replenish feeder 30 (reel 31) to part mounting machine 20 in production system 10 configured as described above due to setup change, no parts, and the like. FIG. 5 is a flowchart illustrating an example of delivery control processing performed by stock/delivery control section 45 of reel storage 40.

When delivery control processing is performed, stock/delivery control section 45 first determines whether a login request operation has been performed by a user via operation panel 42 (step S100). When it is determined that the login request operation has not been performed, stock/delivery control section 45 returns to step S100. Meanwhile, when it is determined that the login request operation has been performed, stock/delivery control section 45 displays a user information input screen requesting a user (an operator) to input user information (a user ID and a password) on operation panel 42, waits for the input to be completed (step S110), and then stock/delivery control section 45 determines whether the input user information is appropriate (step S120). In the present embodiment, this determination is performed by determining whether a user ID and a password input in step S110 match the user ID and the password stored in storage section 46. When it is determined that the input user information is not appropriate, stock/delivery control section 45 returns to step S110. In this case, stock/delivery control section 45 may display an error on operation panel 42.

Figure 7:
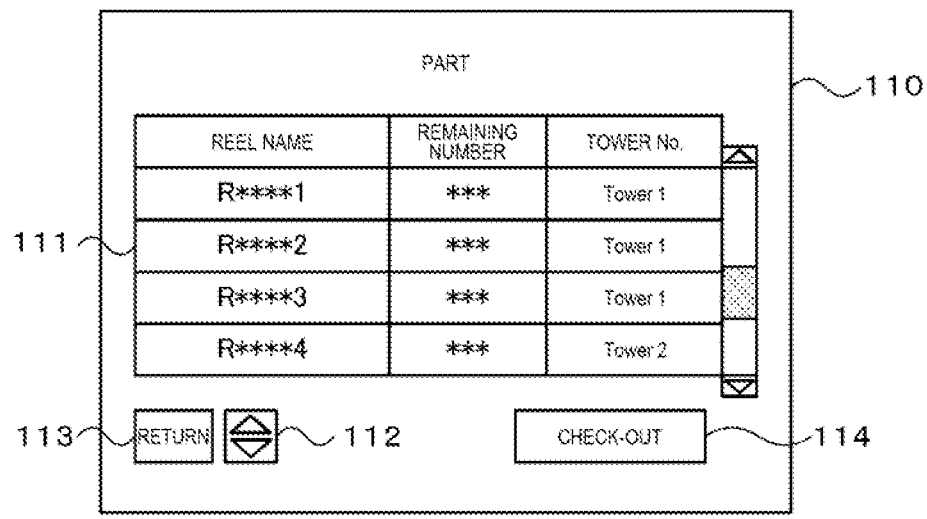
FIG. 7 is an explanatory diagram illustrating an example of a part designation screen.

Meanwhile, when it is determined that the user is appropriate, stock/delivery control section 45 displays a menu screen (step S130). FIG. 7 is an explanatory diagram illustrating an example of the menu screen. As illustrated, menu screen 100 includes part button 101 for calling a reel designation screen for designating reel 31 (part) to be delivered, service button 102 for calling a service screen for checking detailed information of stored reel 31, and logout button 103 for logging out.

Figure 8:
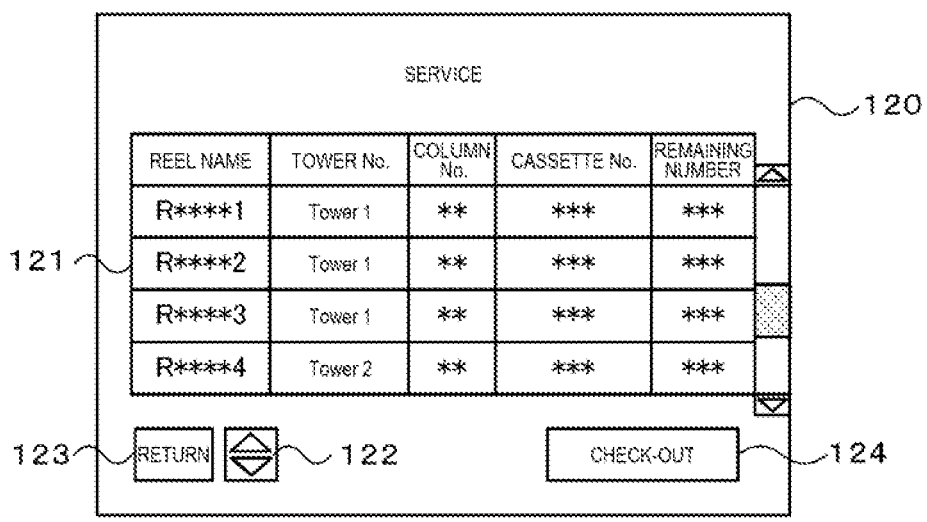
FIG. 8 is an explanatory diagram illustrating an example of a service screen.

In step S140, when the menu screen is displayed, stock/delivery control section 45 determines whether part button 101 is pressed. When it is determined that part button 101 is pressed, stock/delivery control section 45 displays a reel designation screen on operation panel 42 (step S150). FIG. 8 is an explanatory diagram illustrating an example of the reel designation screen. As illustrated, reel designation screen 110 includes list display section 111 that displays a list of a predetermined number of pieces of information on reel 31 stored in reel storage 40, designation button 112 (up-down button) for designating reel 31 to be delivered, return button 113 for returning to an immediately preceding menu screen, and check-out button 114 for requesting delivery of designated reels 31. The information displayed on list display section 111 includes a name (reel name) of reel 31, the remaining number of parts accommodated in reel 31, and information (tower No.) on which of multiple reel storages 40 reel 31 is stored in. After reel 31 is designated, stock/delivery control section 45 determines whether check-out button 114 is pressed, that is, whether delivery of reel 31 is requested (step S160). When it is determined that the delivery of reel 31 is not requested, stock/delivery control section 45 proceeds to step S230. Meanwhile, when it is determined that the delivery of reel 31 is requested, stock/delivery control section 45 determines whether security is applied requiring a security code to designated reel 31 (designation reel) (step S170). This processing is performed by causing stock/delivery control section 45 to transmit a reel ID relating to the designated reel to authentication server 50 to request the determination as to presence or absence of security and to receive a determination result from authentication server 50. Authentication server 50 determines whether security is applied to the designated reel by checking presence or absence of security of reel authentication information 52a in which the received reel ID matches the reel ID. When it is determined that the security is not applied to the designated reel, stock/delivery control section 45 opens a shutter of stock/delivery opening 41 and delivers the designated reel to stock/delivery opening 41 (step S220).

In step S170, when it is determined that security is applied to the designated reel, stock/delivery control section 45 displays a security code request screen for requesting a user to input a security code for the reel 31 on operation panel 42 (step S180), and waits for the security code to be input (step S190). In the present embodiment, the security code is input by a permitted person (a user), who is permitted for receiving the designated reel, by reading a security code (for example, a barcode) previously distributed to the permitted person using reader 43. When it is determined that the security code has been input, the stock/delivery control section 45 determines whether input security code has been successfully authenticated (step S200), and determines the user authentication based on the user information (user ID) input at the time of login in step S100 to step S120 is successful (step S210). The code authentication for the reel is performed by causing stock/delivery control section 45 to transmit a reel ID relating to the designated reel and the security code to authentication server 50 to request the code authentication and to receive an authentication result from authentication server 50. The authentication server 50 reads a security code received from stock/delivery control section 45, and determines a success or failure of the code authentication based on whether the read security code for the reel ID matches the security code for the reel based on the reel authentication information 52a. Further, the user authentication is performed by causing stock/delivery control section 45 to transmit the reel ID relating to the designated reel and a user ID to authentication server 50 to request user authentication, and to receive an authentication result from authentication server 50. Authentication server 50 reads a user ID of reel authentication information 52a in which the reel ID received from stock/delivery control section 45 matches and a reel ID and determines success or failure of the user authentication based on whether the read user ID matches the user ID received from stock/delivery control section 45. The code authentication and the user authentication may be performed together or may be performed separately. When it is determined that both the code authentication and the user authentication are successful (YES in both step S200 and step S210), stock/delivery control section 45 opens a shutter of stock/delivery opening 41 and delivers the designated reel to stock/delivery opening 41 (step S220). In the present embodiment, when delivering reel 31, stock/delivery control section 45 transmits reel information such as a reel ID thereof to management server 60. Meanwhile, when it is determined that either the code authentication or the user authentication fails (either step S200 or step S210 is NO), stock/delivery control section 45 returns to step S180 without delivering the designated reel. In this case, stock/delivery control section 45 may display an error on operation panel 42.

In the present embodiment, when an inexpensive reel (a normal reel) and an expensive reel (a specific reel) are mixed in one reel storage 40, security can be applied only to the specific reel. Thereby, it is possible to prevent the specific reel from being illegally taken out while performing smooth delivery of the normal reel.

When the designated reel is delivered, stock/delivery control section 45 determines whether a logout request operation is performed (whether logout button 103 is pressed) (step S230). When it is determined that the logout request operation has not been performed, stock/delivery control section 45 returns to the menu screen in step S130, whereas when it is determined that the logout request operation has been performed, stock/delivery control section 45 ends the delivery control processing.

When it is determined in step S140 that part button 101 is not pressed, stock/delivery control section 45 determines whether service button 102 is pressed (step S240). When it is determined that service button 102 is not pressed, stock/delivery control section 45 proceeds to step S230. Meanwhile, when it is determined that service button 102 is pressed, stock/delivery control section 45 determines whether a user logged in in step S100 to step S120 is a manager (step S250). This processing is performed by determining whether a user ID input at the time of login matches a manager ID previously determined as the manager and stored in storage section 46. When it is determined that the user is not the manager, the processing proceeds to step S230, whereas when it is determined that the user is the manager, stock/delivery control section 45 displays a service screen on operation panel 42 (step S260). FIG. 8 is an explanatory diagram illustrating an example of a service screen. As illustrated, service screen 120 includes list display section 121 that displays a list of a predetermined number of pieces of detailed information on reels 31 stored in reel storage 40, designation button 122 (up-down button), return button 123, and check-out button 124. The detailed information displayed on list display section 121 includes information (tower No.) on which reel 31 is stored in one of multiple reel storages 40, information (column No.) on which reel 31 is stored in one of columns of reel storages 40, and information (cassette No.) on which reel 31 is stored in one of cassettes, in addition to the reel name and the remaining number of parts. In step S270, stock/delivery control section 45 determines whether check-out button 124 is operated, that is, whether delivering of reel 31 is requested. When it is determined that the delivering of reel 31 is not requested, stock/delivery control section 45 proceeds to step S230. Meanwhile, when it is determined that delivery of reel 31 is requested, stock/delivery control section 45 proceeds to step S170.

As described above, in the present embodiment, service screen 120 for displaying details of a storage location of reel 31 is permitted to be browsed by only a manager. Therefore, for example, when reel 31 can be directly taken out from another take-out opening of reel storage 40, it is possible to effectively prevent a person other than the manager from browsing service screen 120 and illegally taking out the specific reel by checking a storage location of an expensive reel (specific reel) from service screen 120.

Figure 9:
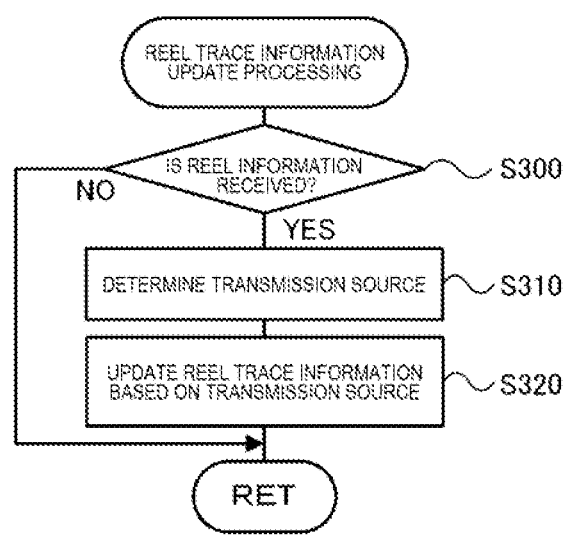
FIG. 9 is a flowchart illustrating an example of reel trace information update processing.

Next, management of reel trace information performed by management server 60 will be described. FIG. 9 is a flowchart illustrating an example of reel trace information update processing. In the reel trace information update processing, management control section 61 of management server 60) determines whether reel information is received (step S300). In the present embodiment, part mounting machine 20 (mounting control section 25) communicates with feeder 30 to receive reel information (reel ID or the like) from feeder 30 when feeder 30 is mounted on feeder base 21, and transmits the received reel information to management server 60 together with a mounting machine ID for identifying part mounting machine 20. Further, when reel 31 is set in feeder 30, reel loader 35 transmits reel information of reel 31 to management server 60 together with a loader ID for identifying reel loader 35. Furthermore, as described above, when reel 31 is delivered, reel storage 40 (stock/delivery control section 45) transmits the reel information of reel 31 to management server 60 together with a storage ID for identifying reel storage 40. Therefore, the determination in step S300 is made as to whether reel information is received from any of part mounting machine 20, reel loader 35, and reel storage 40. When it is determined that the reel information is not received, management control section 61 ends the reel trace information update processing herein. Meanwhile, when it is determined that the reel information is received, management control section 61 determines a transmission source (ID) of the reel information (step S310), updates reel trace information 62a (trace information) based on the determined transmission source (step S320), and ends the reel trace information update processing. Thereby, it is possible to easily grasp where the delivered reel 31 is currently present and to find out an illegal taking-out and the like.

Here, a correspondence relationship between main elements of the embodiment and main elements of the present disclosure will be described. That is, reel storage 40 of the embodiment corresponds to a part storage of the present disclosure, a system including reel storage 40 and authentication server 50 corresponds to a part storage system, storage sections 46 and 52 correspond to a storage device, operation panel 42 and reader 43 correspond to an input device, and stock/delivery control section 45 corresponds to a control device.

The present disclosure is not limited to the embodiments described above, and it is needless to say that the present disclosure may be implemented in various aspects without departing from the technical scope thereof.

For example, in the above-described embodiments, code authentication using a security code is employed as the means for authenticating a permitted person who is permitted to receive reel 31 to which security is applied. However, any other authentication means such as face authentication and fingerprint authentication may be employed.

In the above-described embodiments, stock/delivery control section 45 may deliver the designated reel only when both code authentication and user authentication are successful in a case where security is applied to the designated reel. However, stock/delivery control section 45 may omit the user authentication and deliver the designated reel when the code authentication is successful.

In the above-described embodiments, stock/delivery control section 45 regulates calling of service screen 120 such that only the manager can browse details of a storage location of reel 31. However, stock/delivery control section 45 may enable all users to browse storage locations of reels 31 to which security is not applied among reels 31 stored in reel storage 40 and enable only a manager to browse storage locations of reels 31 to which security is applied.

In the above-described embodiments, a part delivery system includes authentication determination section 51, storage section 52 that stores reel authentication information 52a including presence or absence of security for each reel ID and a security code, and authentication server 50 that determines presence or absence of security and performs authentication processing when a reel to which security is applied is delivered in response to a request from reel storage 40 (stock/delivery control section 45). However, authentication server 50 may store reel authentication information 52a in storage section 52 but may not perform the determination of presence or absence of security and the authentication processing. In this case, reel storage 40 (stock/delivery control section 45) may acquire the presence or absence of security relating to the designated reel and or the security code from authentication server 50 (storage section 52) to determine the presence or absence of security and perform authentication processing. Further, when reel storage 40 determines presence or absence of security or performs authentication processing, reel authentication information may be stored in storage section 46 of reel storage 40. In this case, authentication server 50 can be omitted. Likewise, user authentication may also be performed by reel storage 40 without being limited to being performed by authentication server 50.

As described above, the part delivery system of the present disclosure is a part delivery system that delivers a part designated from multiple parts stored in a part storage, and a gist thereof is to include a storage device configured to store part information including a part ID for identifying a part for each part and presence or absence of security, an input device configured to input information, and a control device configured to receive designation of a part to be delivered to a user, to determine whether security is applied to a received designated part based on the part information, to deliver the designated part when it is determined that the security is not applied to the designated part, to request the user to input authentication information on the designated part when it is determined that the security is applied to the designated part, and to deliver the designated part only when authentication is successful based on the authentication information input by the user through the input device.

A part delivery system of the present disclosure includes a storage device configured to store part information including a part ID for identifying a part for each part and presence or absence of security and a control device. The control device receives designation of a part to be delivered to a user and determines whether security is applied to a received designated part based on the part information stored in the storage device. The control device delivers the designated part when it is determined that the security is not applied to the designated part. Meanwhile, the control device requests the user to input authentication information on the designated part when it is determined that the security is applied to the designated part and delivers the designated part only when authentication is successful based on the authentication information input by the user. Thereby, when a normal part and a specific part are mixed in a single part storage, security can be applied to only the specific part. As a result, it is possible to provide a part delivery system capable of preventing a specific part from being illegally taken out while smoothly delivering a normal part.

In the part delivery system of the present disclosure, part information of a part to which the security is applied may include a user ID for identifying a user, and the control device may receive an input of the user ID and the designation of the part to be delivered to the user, determine success or failure of authentication based on the authentication information input by the user when the security is applied to the designated part, and deliver the designated part only when the authentication is successful and the user ID received from the user matches another user ID included in part information of the designated part. Accordingly, it is possible to easily enhance security of a specific part.

Further, the part delivery system of the present disclosure may further include a display device configured to display part-related information relating to a part stored in the part storage, and the part information may include a storage location of the part storage in which the part is stored, and the display device may regulate at least display of the storage location of the part to which the security is applied, as the part-related information. Accordingly, it is possible to prevent an unauthorized person from browsing storage locations of parts and illegally taking out the parts.

Furthermore, the part delivery system of the present disclosure may further include a management device configured to communicably connected to a mounting machine for mounting a part supplied from a mounted feeder, communicably connected to the control device, and configured to store part information including the part ID for identifying the part for each part and trace information of the part, and the management device may acquire a part ID of a part mounted in a mounted feeder and a mounting machine ID for identifying the mounting machine from the mounting machine when the feeder is mounted in the mounting machine and may update the trace information based on the acquired part ID and the acquired mounting machine ID. Accordingly, it is possible to easily grasp where a delivered part is currently present and to find out an illegal taking-out and the like.

INDUSTRIAL APPLICABILITY

The present disclosure can be applied to a manufacturing industry and the like of a part delivery system.

REFERENCE SIGNS LIST

10: production system, 11: network, 20: part mounting machine, 21: feeder base, 22: board conveyance device, 23: head, 24: head moving device, 25: mounting control section, 26: storage section, 27: communication section, 30: feeder, 31: reel, 35: reel loader, 40: reel storage, 41: stock/delivery opening, 42: operation panel, 43: reader, 45: stock/delivery control section, 46: storage section, 46a: reel storage information, 47: communication section, 48: storage section, 50: authentication server, 51: authentication determination section, 52: storage section, 52a: reel authentication information, 53: communication section, 60: management server, 61: management control section, 62: storage section, 62a: reel trace information, 63: communication section, 100: menu screen, 101: part button, 102: service button, 103: logout button, 110: reel designation screen, 111: list display section, 112: designation button, 113: return button, 114: check-out button 120: service screen, 121: list display section, 122: designation button, 123: return button, 124: check-out button, S: board.

The invention claimed is:

1. A part delivery system configured to deliver a part designated from multiple parts stored in a part storage, comprising:
   a storage device configured to store part information including a part ID for identifying a part and presence or absence of security for each part;
   an input device configured to input information;
   a control device configured to
     receive designation of a part to be delivered from a user,
     determine whether security is applied to the received designated part via an authentication based on the part information,
     deliver the designated part when it is determined that the security is not applied to the designated part,
     request the user to input authentication information on the designated part when it is determined that the security is applied to the designated part, and
     deliver the designated part only when authentication is successful based on the authentication information input by the user through the input device; and
   a management device configured to
     be communicably connected to a mounting machine, the mounting machine being configured to mount a part supplied from a mounted feeder,
     be communicably connected to the control device,
     for each part, store part information including the part ID for identifying the part, and trace information of the part,
     acquire the part ID of each part mounted in a mounted feeder, and a mounting machine ID for identifying the mounting machine that has mounted the part that was received by the feeder, and
     update the trace information for the mounted part based on the acquired part ID and the acquired mounting machine ID once the part is mounted by the mounting machine.

2. The part shipping system according to claim 1, wherein the part information of a part to which the security is applied includes a user ID for a user that is authorized to receive the part, and
   the control device is configured to
   receive an input of the user ID and the designation of the part to be delivered from the parts storage,
   when the user requests a part to which security is applied, determine success or failure of authentication of the user based on the authentication information input by the user when the security is applied to the designated part, the authentication information further including a user ID, and
   deliver the designated part only when the user ID matches a user ID included in part information of the designated part.

3. The part shipping system according to claim 1, further comprising:
   a display device configured to display part-related information relating to a part stored in the part storage,
   wherein the part information includes a storage location of the part storage in which the part is stored, and
   the display device displays the storage location of the part to which the security is applied, as the part-related information, only to an authorized person.

* * * * *